May 31, 1955  C. G. HOCKETT  2,709,476
MACHINE FOR FORMING A WOUND FILTER CARTRIDGE
Filed April 14, 1951  15 Sheets-Sheet 7

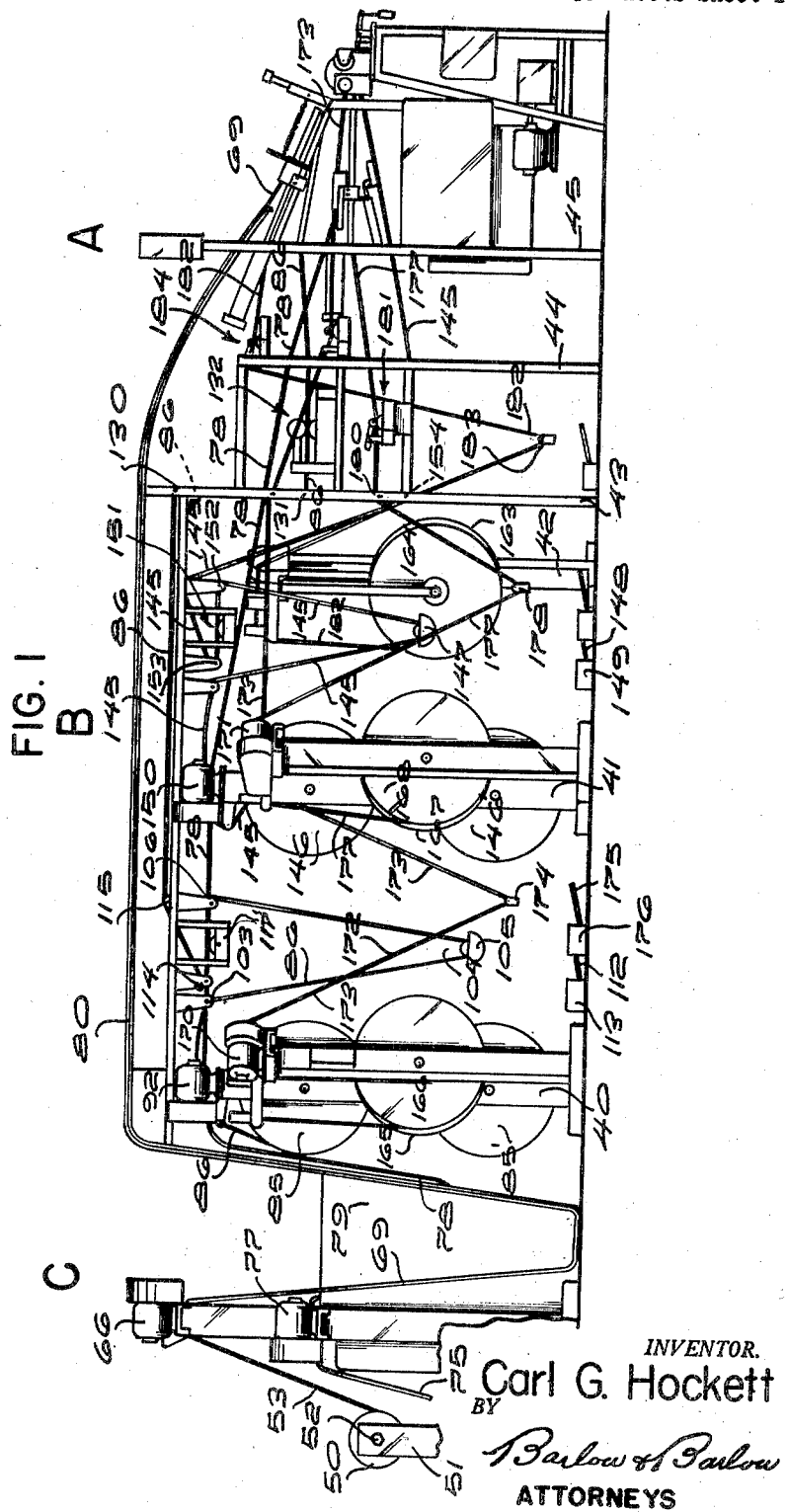

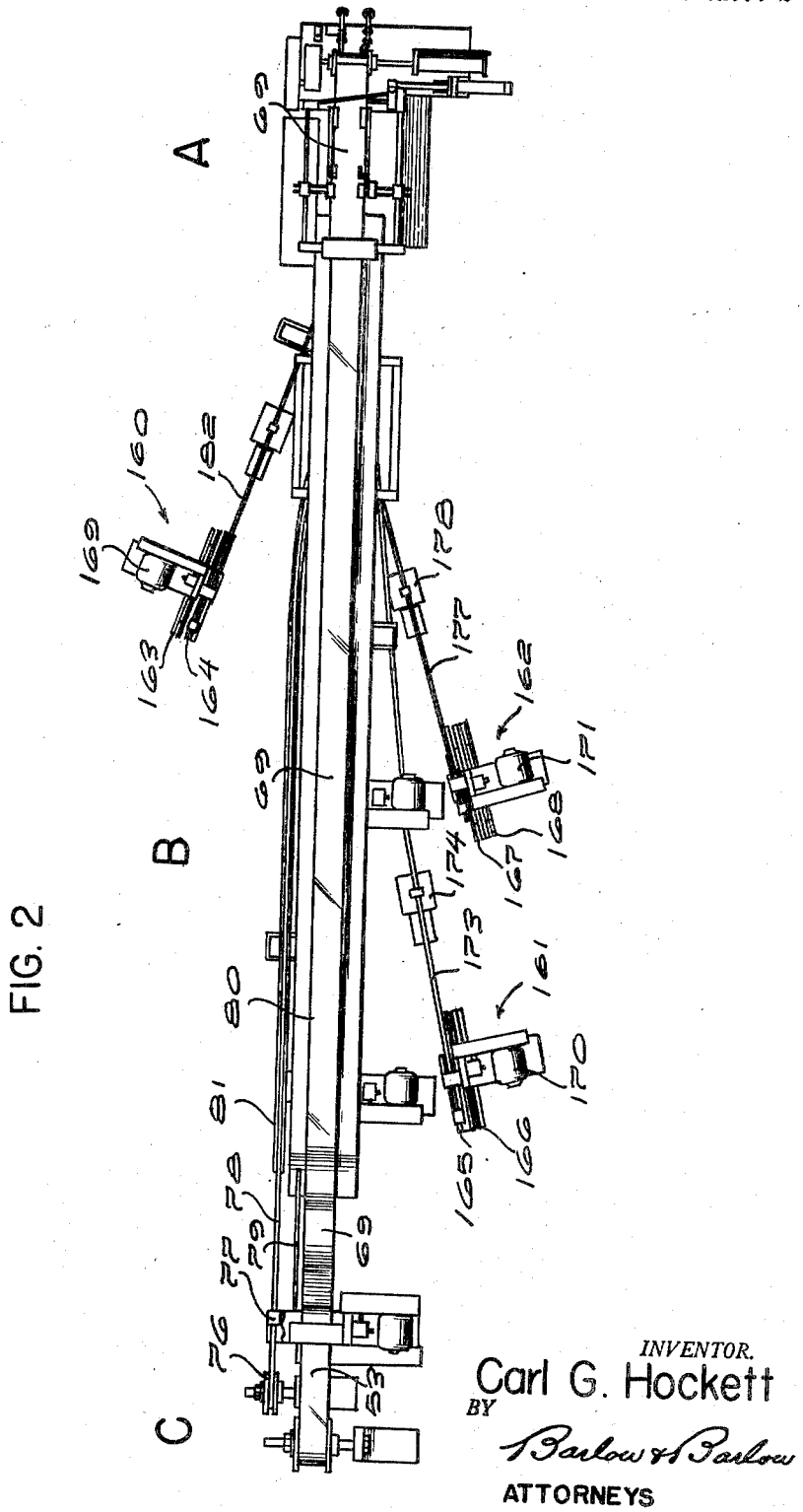

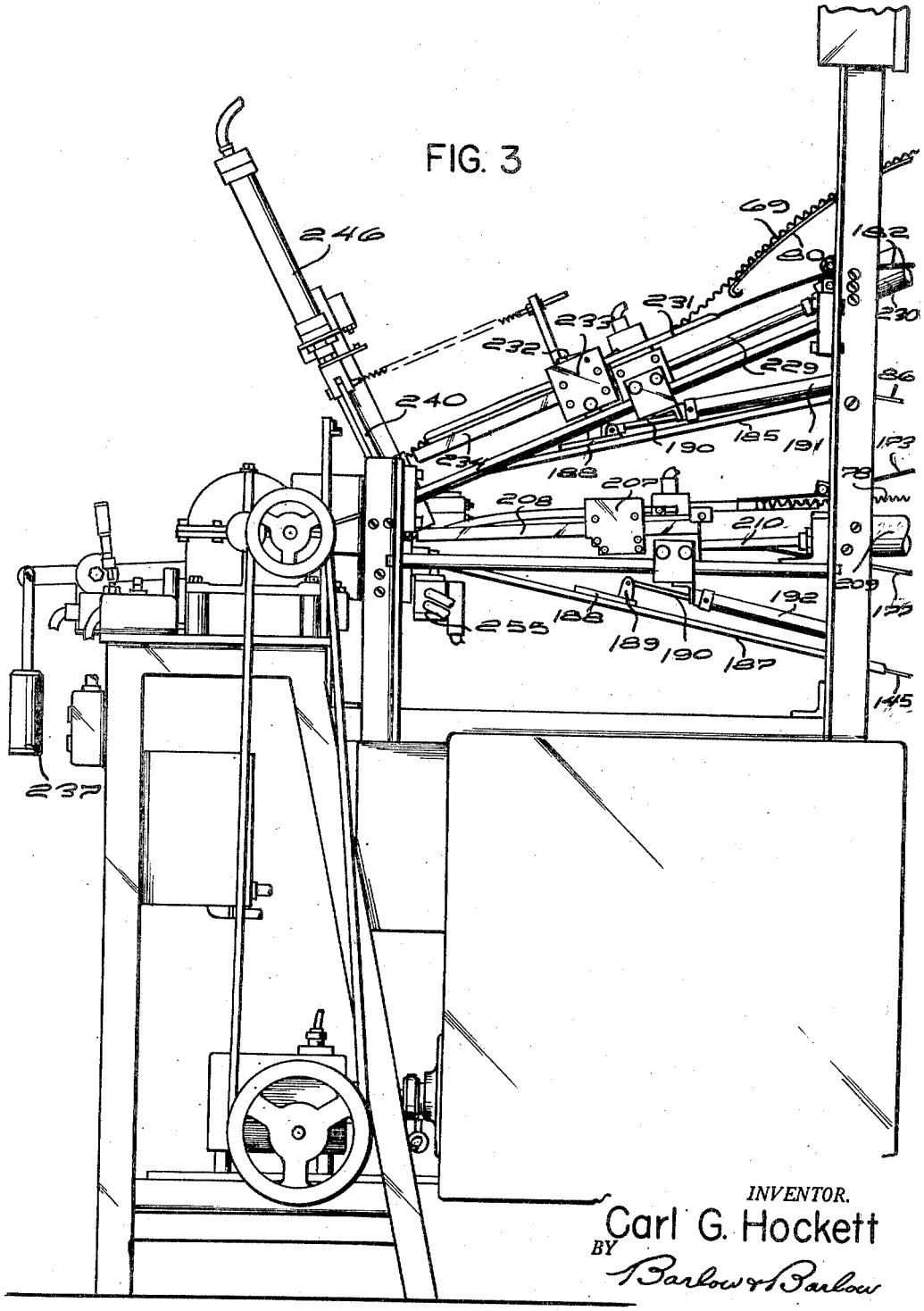

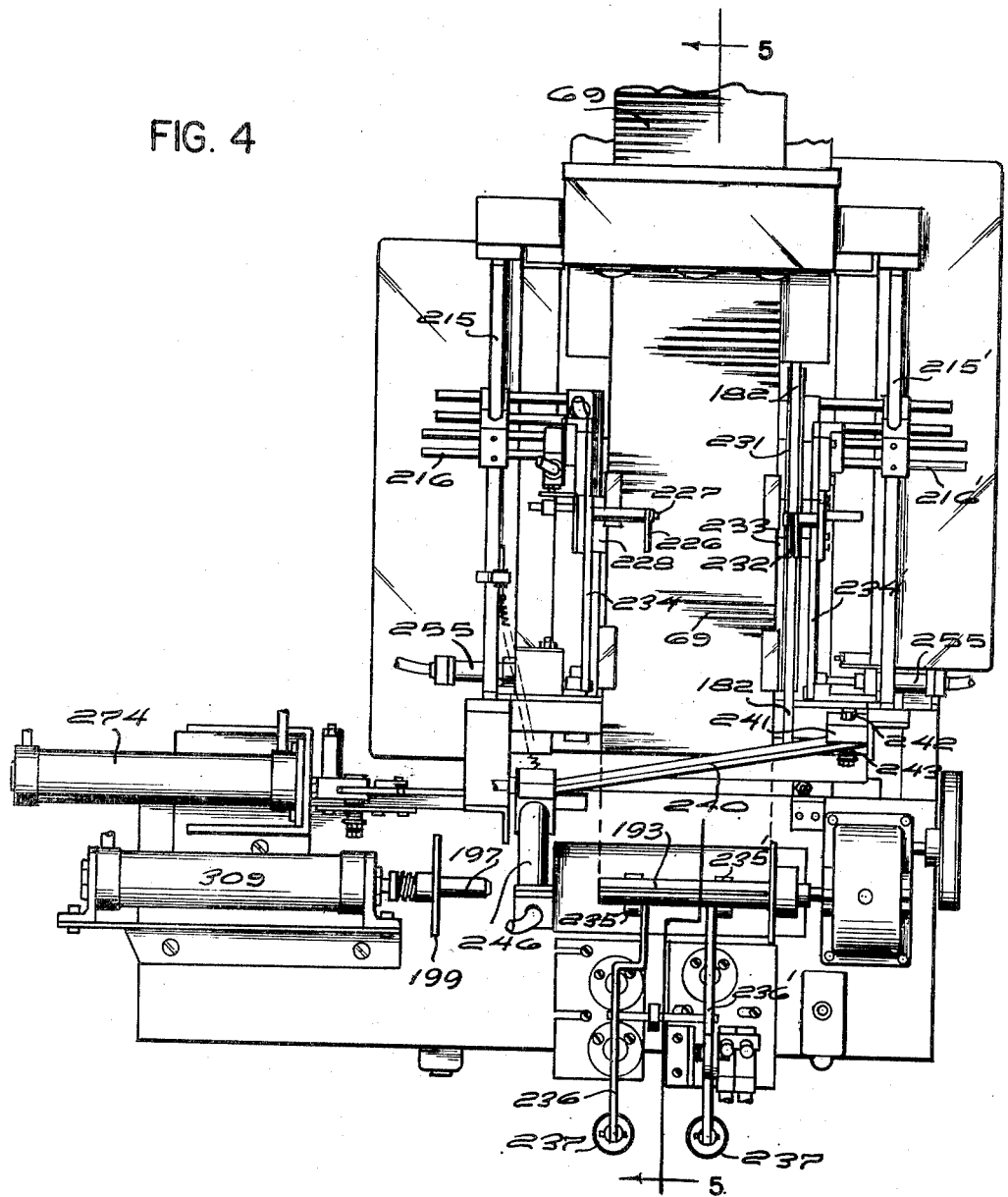

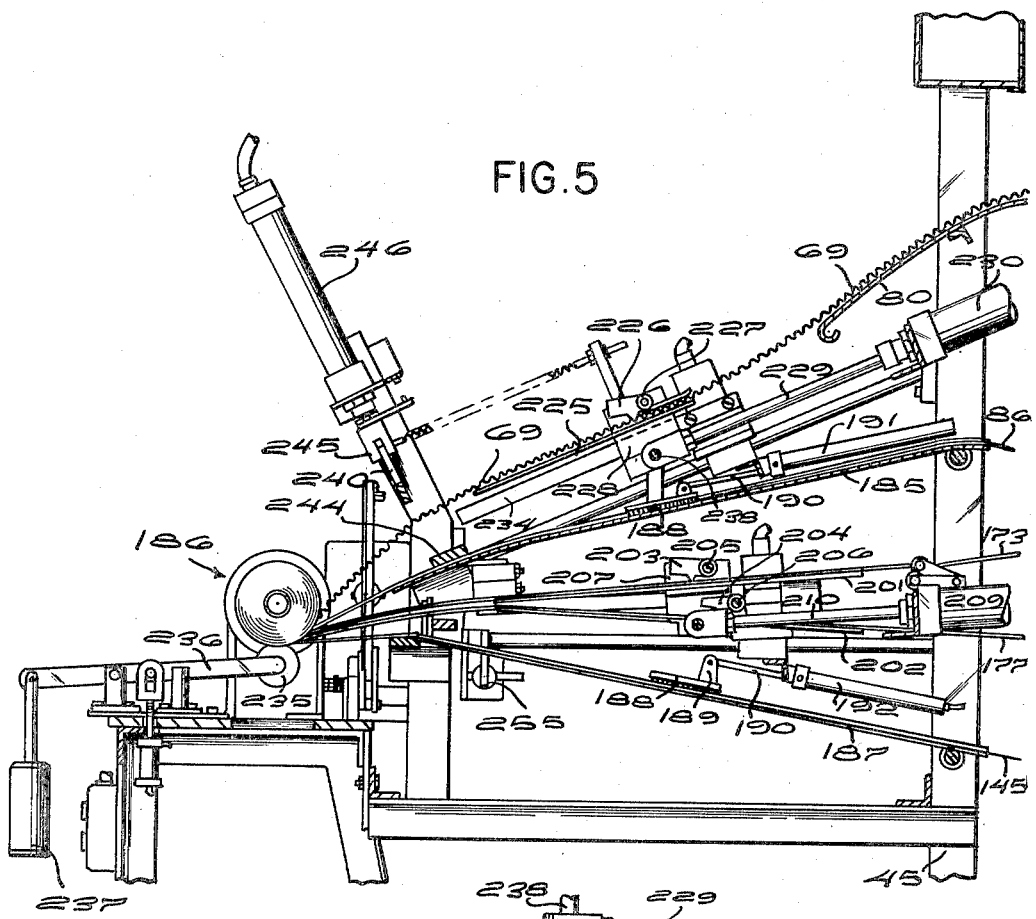
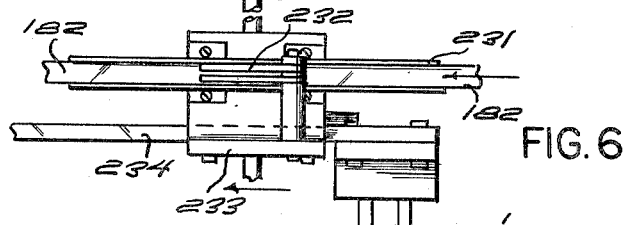
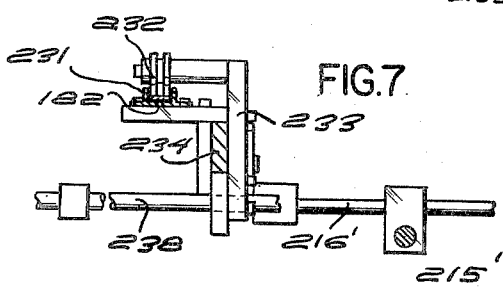

*INVENTOR.*
Carl G. Hockett
BY
*Barlow & Barlow*
ATTORNEYS

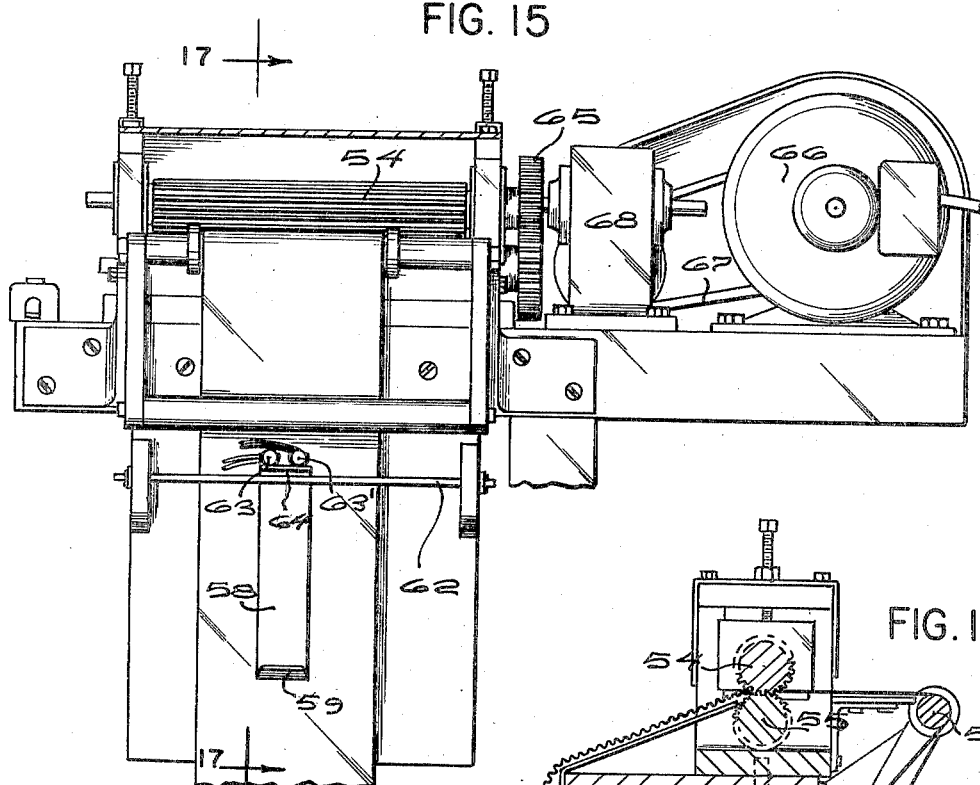
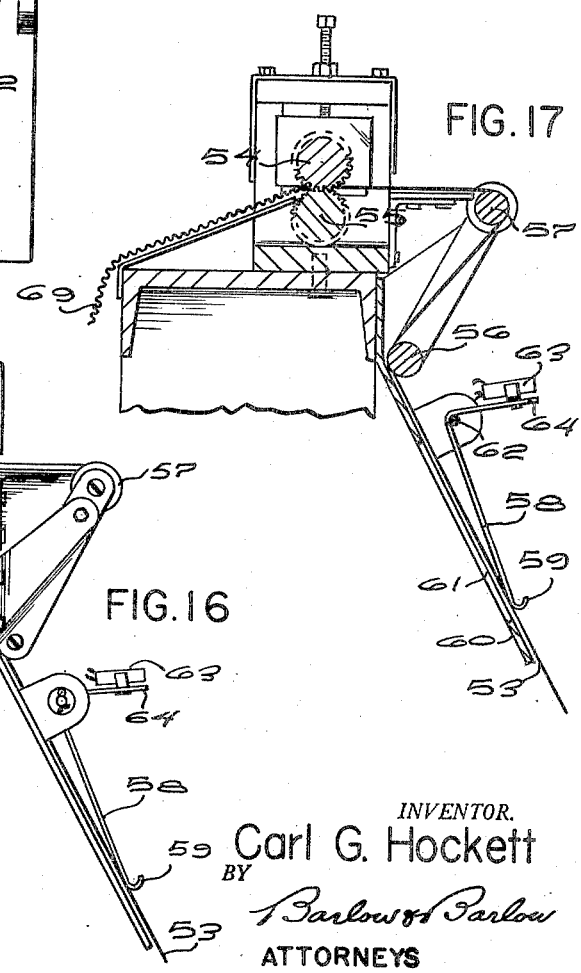
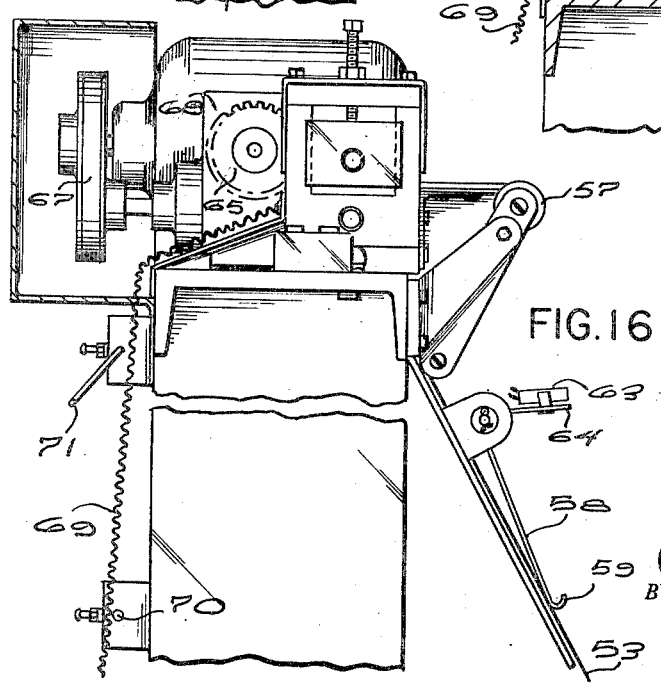

May 31, 1955 C. G. HOCKETT 2,709,476
MACHINE FOR FORMING A WOUND FILTER CARTRIDGE
Filed April 14, 1951 15 Sheets-Sheet 9
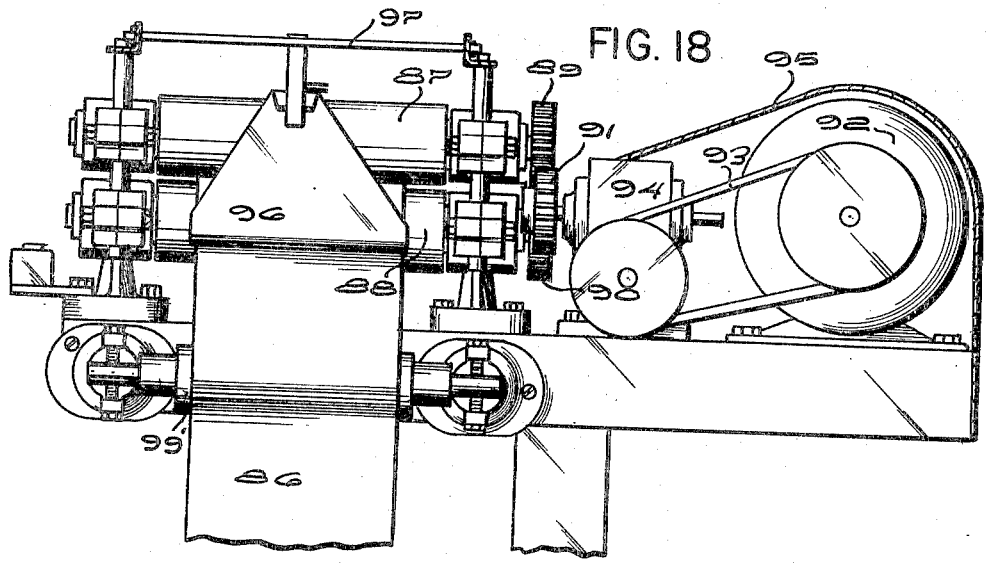
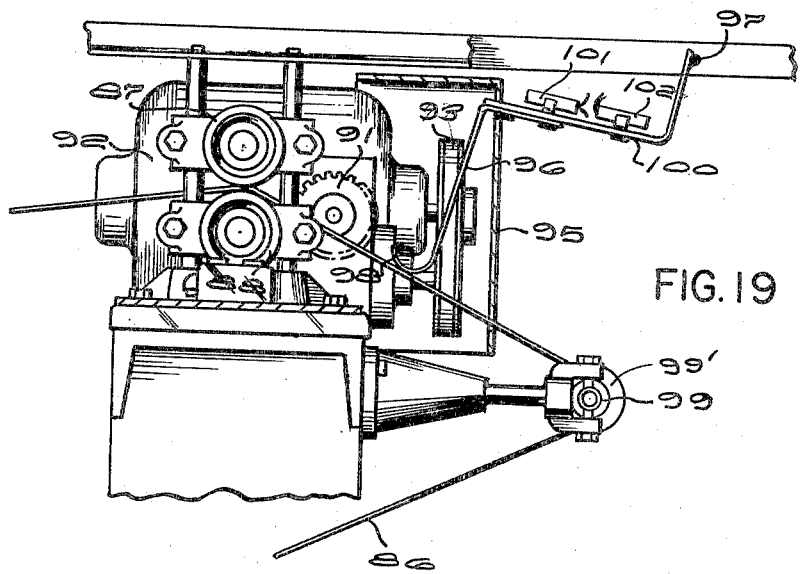
INVENTOR.
Carl G. Hockett
BY
Barlow & Barlow
ATTORNEYS

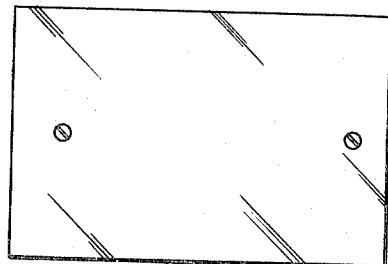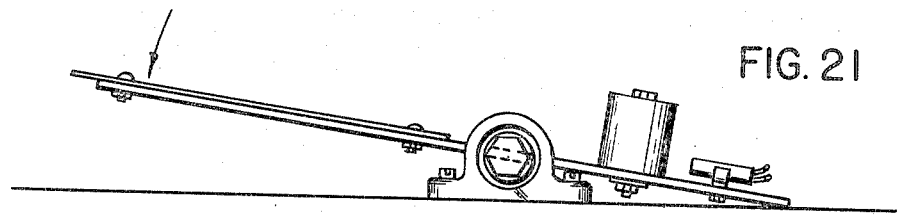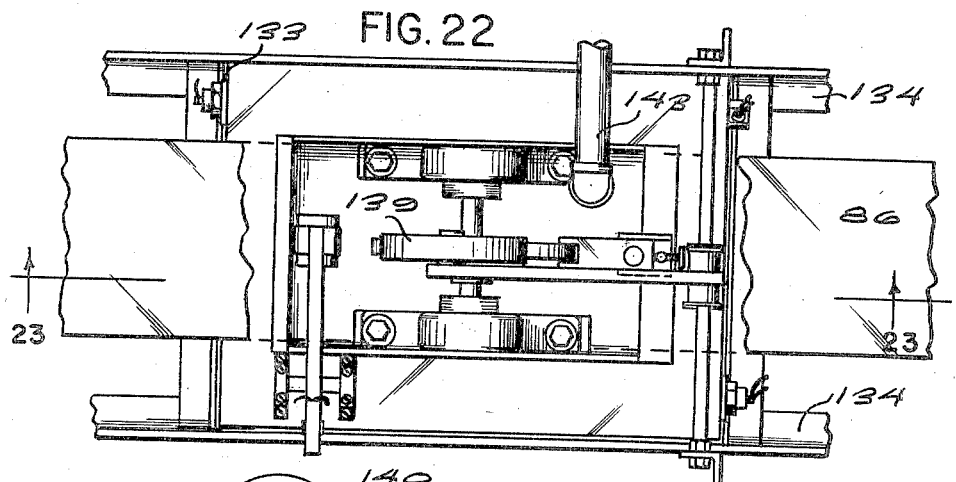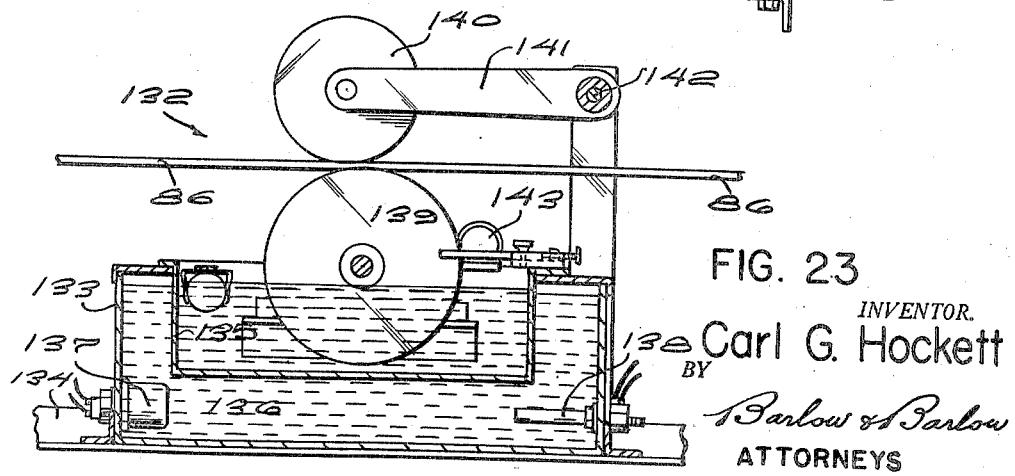

May 31, 1955  C. G. HOCKETT  2,709,476
MACHINE FOR FORMING A WOUND FILTER CARTRIDGE
Filed April 14, 1951  15 Sheets-Sheet 11
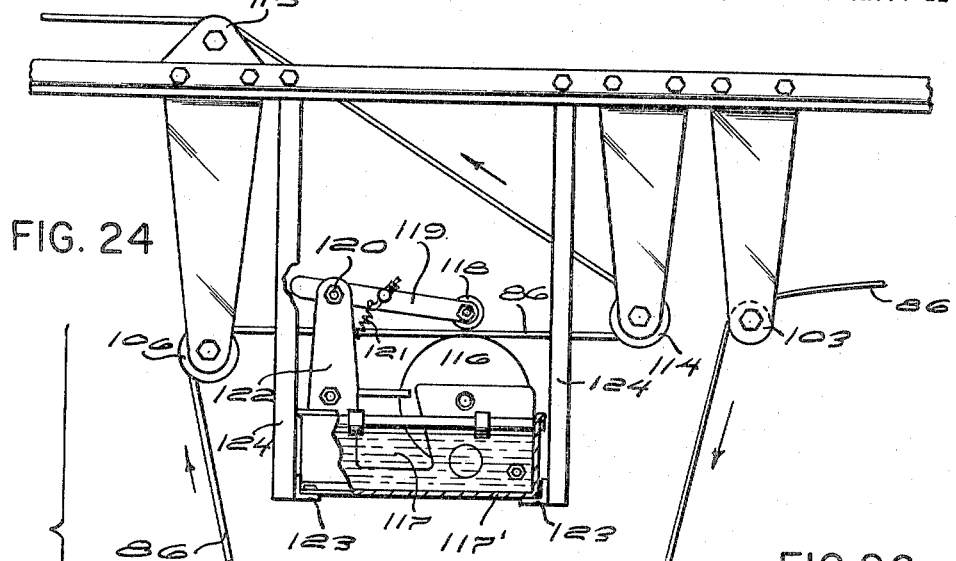
FIG. 24
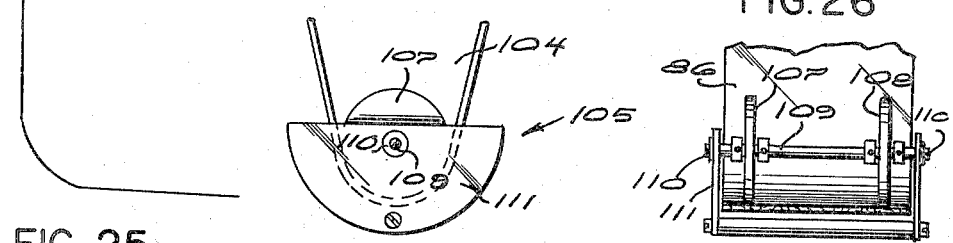
FIG. 25
FIG. 26
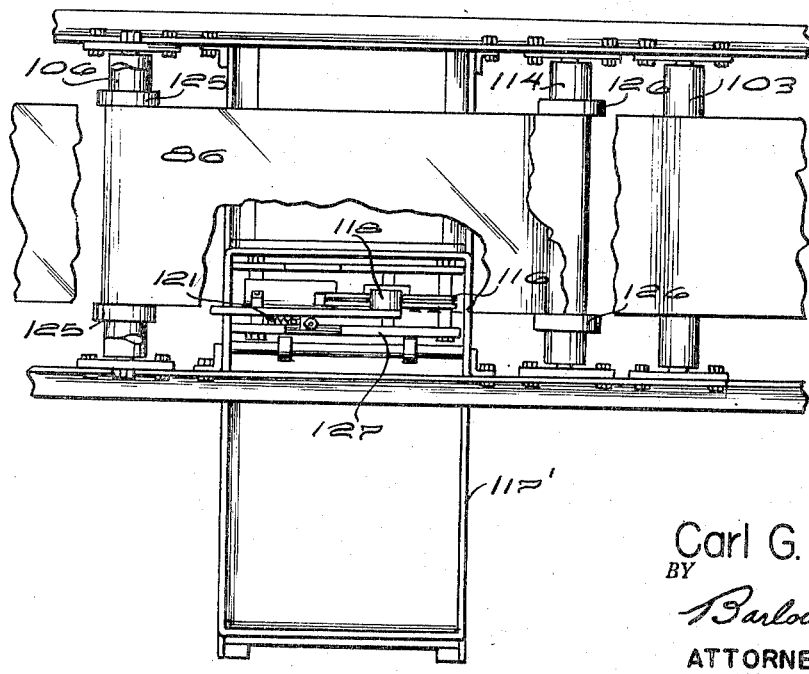
INVENTOR.
Carl G. Hockett
BY
Barlow & Barlow
ATTORNEYS May 31, 1955  C. G. HOCKETT  2,709,476
MACHINE FOR FORMING A WOUND FILTER CARTRIDGE
Filed April 14, 1951  15 Sheets-Sheet 12
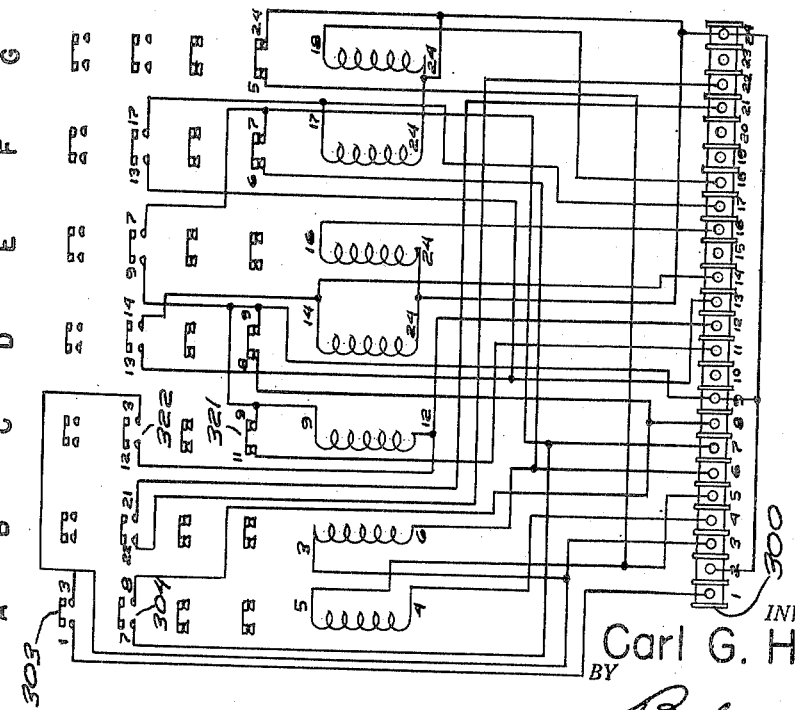
INVENTOR.
Carl G. Hockett
BY
ATTORNEYS

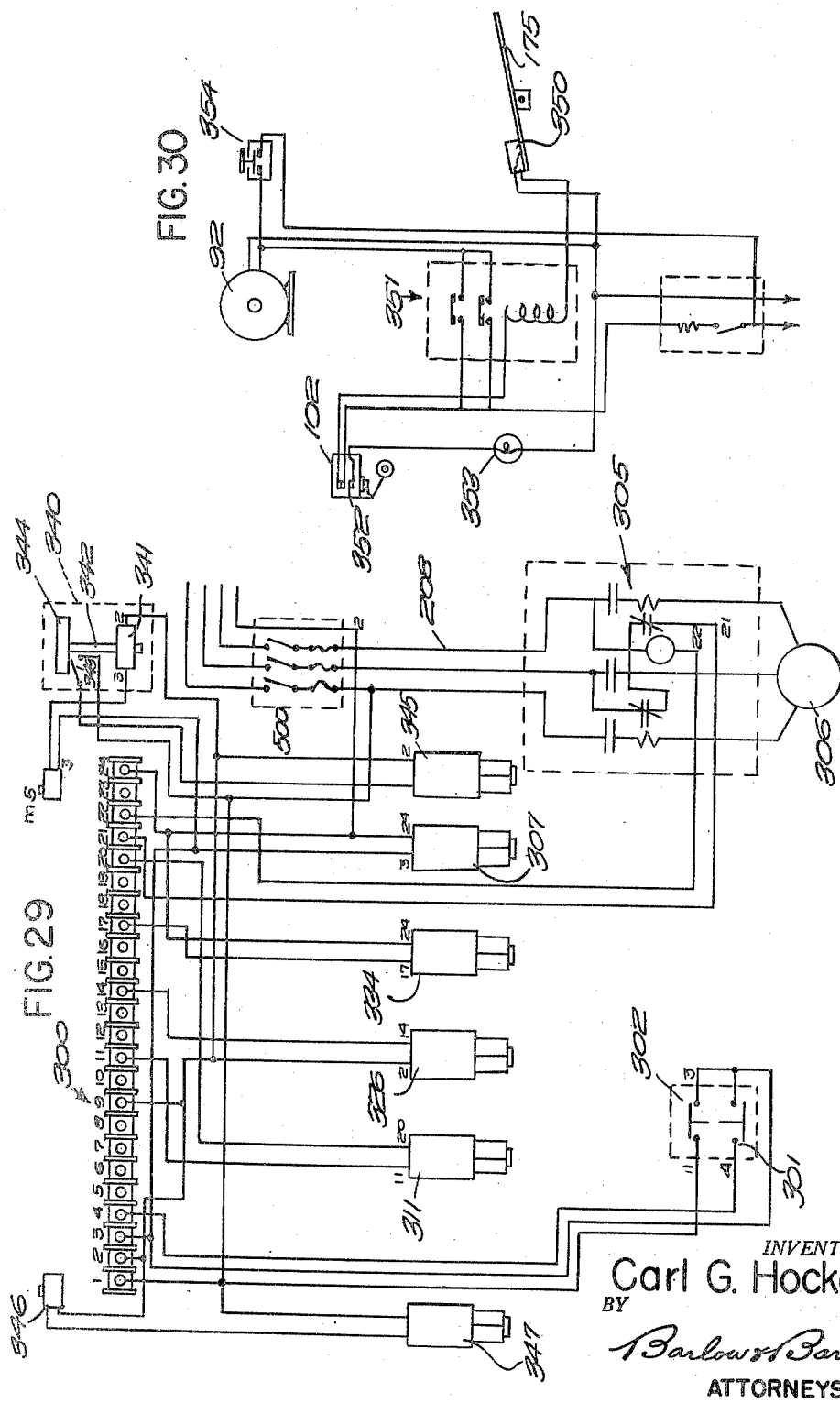

May 31, 1955 C. G. HOCKETT 2,709,476
MACHINE FOR FORMING A WOUND FILTER CARTRIDGE
Filed April 14, 1951 15 Sheets-Sheet 14
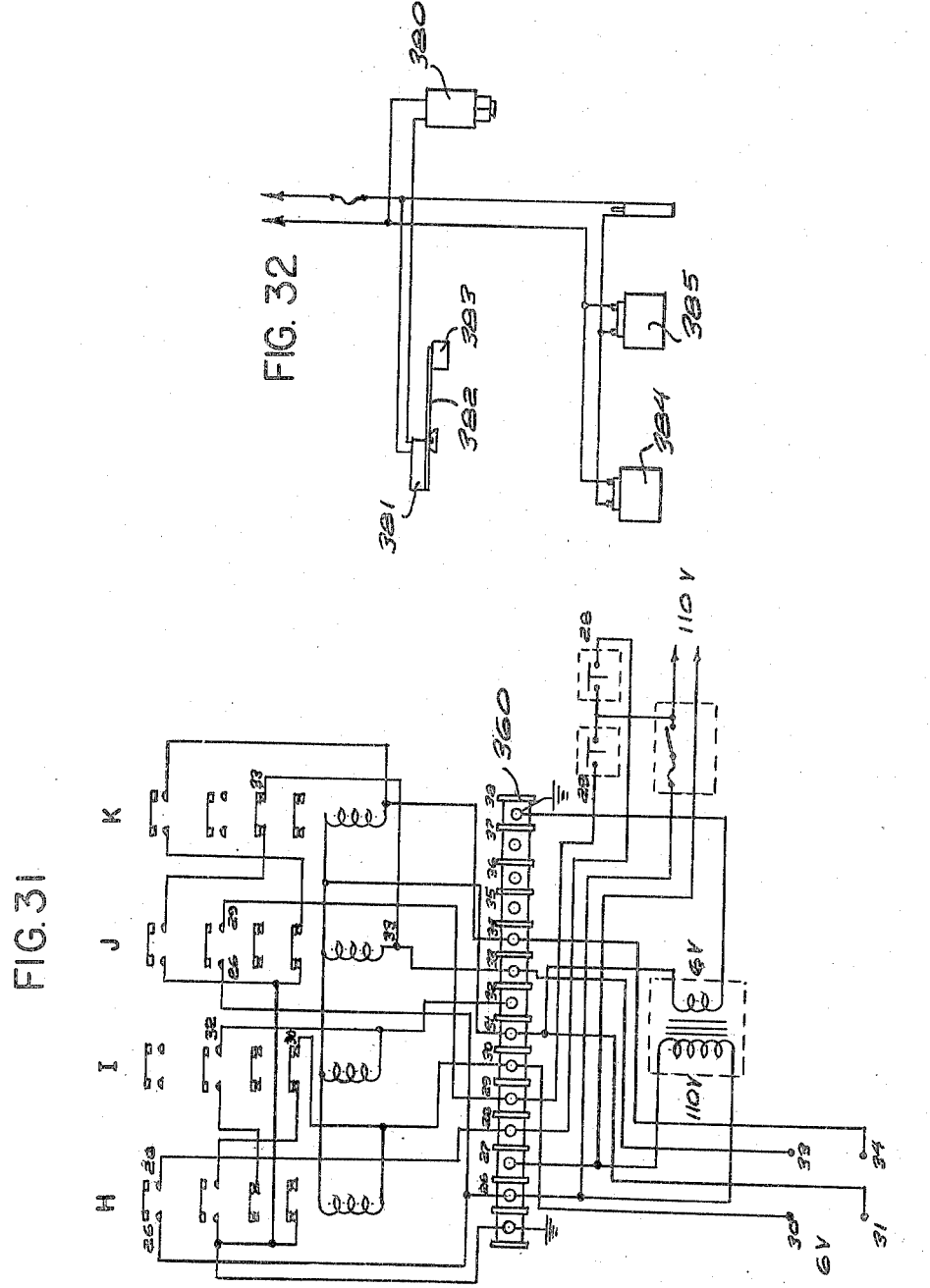
INVENTOR.
Carl G. Hockett
BY
Barlow & Barlow
ATTORNEYS May 31, 1955   C. G. HOCKETT   2,709,476
MACHINE FOR FORMING A WOUND FILTER CARTRIDGE
Filed April 14, 1951   15 Sheets-Sheet 15

INVENTOR.
Carl G. Hockett
BY
Barlow & Barlow
ATTORNEYS

United States Patent Office 2,709,476
Patented May 31, 1955

2,709,476

MACHINE FOR FORMING A WOUND FILTER CARTRIDGE

Carl G. Hockett, Uxbridge, Mass., assignor to Fram Corporation, a corporation of Rhode Island Application April 14, 1951, Serial No. 221,037

8 Claims. (Cl. 154—1.8)

This application relates to apparatus for making a filter element.

One form of filter such as is used in the filtering of lubricating oil for an internal combustion engine comprises an element having a pair of filter webs which are spirally wound with a space between the two webs and a space between the spiral winds so that liquid to be filtered may enter an end of the spiral coil, pass through one of the webs of filtering material, and be discharged from the other end of the spiral coil. Spacing means are provided to maintain the desired spaces between the filter webs and between the spiral coils to control the flow into and from the spaces desired.

One of the objects of this invention is to provide a machine which will produce such a coiled filter element.

Another object of the invention is to provide a machine which will draw and coil the filter webs as desired.

Another object of the invention is to control the length of material coiled that the desired size of the coiled element may be provided.

Another object of the invention is to provide a means for cutting off the webs and strips at different locations depending upon the function which they are to perform.

Another object of the invention is to start the winding slowly, speed up the winding as it progresses, and decelerate the winding as the end of the desired length of the winding approaches.

Another object of the invention is to provide controls so that should an exhaustion of a web occur, the operator will be notified so that the exhausted material may be replenished.

Another object of the invention is to provide supplies for the different web materials which are used so that as one web is exhausted, another web may be readily pieced onto the trailing end of the exhausting web and the operation continued.

Another object of the invention is to provide a chemical treatment on the web material as may be desired.

Another object of the invention is to cement the webs and strips as the machine progresses in its operation.

Another object of the invention is to positively control and positively move certain of the webs or strips in certain portions of their operation.

Another object of the invention is to advance the web material as one of the coils is completed for use to facilitate the starting of the next coil.

With these and other objects in view, the invention consists of certain novel features of construction, as will be more fully described and particularly pointed out in the appended claims.

In the accompanying drawings:

Fig. 1 is a side elevation showing the advancing of the material from left to right in the apparatus;

Fig. 2 is a top plan view of the structure shown in Fig. 1;

Fig. 3 is a side elevation looking at the opposite side of the machine from that shown in Fig. 1 of certain of the feeding mechanism at the forward end of the machine;

Fig. 4 is a top plan view of the structure shown in Fig. 3;

Fig. 5 is a central sectional view on substantially line 5—5 of Fig. 4;

Fig. 6 is a fragmental top plan view of a part of the feeding mechanism;

Fig. 7 is a sectional view looking at the end of the structure in Fig. 6;

Fig. 15 is a sectional view on substantially line 15—15 of Fig. 1, showing the mechanism which corrugates and feeds a spacer which is placed between the coils of web material;

Fig. 16 is an elevation partly in section looking from the left of Fig. 15;

Fig. 17 is a section on line 17—17 of Fig. 15 with parts back of the plane of the section omitted;

Fig. 18 is an end elevation showing the feeding mechanism for one of the filter webs of material;

Fig. 19 is an elevation with the guard in section showing the lead of the web material through the feeding mechanism of Fig. 18;

Fig. 20 is a top plan view of one of the control switches for controlling the feed of web material;

Fig. 21 is a side elevation of the structure shown in Fig. 20;

Fig. 22 is a top plan view of the mechanism for applying chemical treatment to one of the web materials;

Fig. 23 is a sectional view on line 23—23 of Fig. 22;

Fig. 24 is an elevation partly in section showing a strip of filtering material having a liquid cement applied thereto;

Fig. 25 is a top plan view partly broken away and showing the structure of Fig. 24;

Fig. 26 is a sectional view of the control weight shown in Fig. 24 immediately to the left of this figure;

Figs. 27, 28, 29, 30, 31, 32 and 33 are diagrammatic views of certain wiring mechanism for the control of the various parts of the apparatus.

Figure 8:
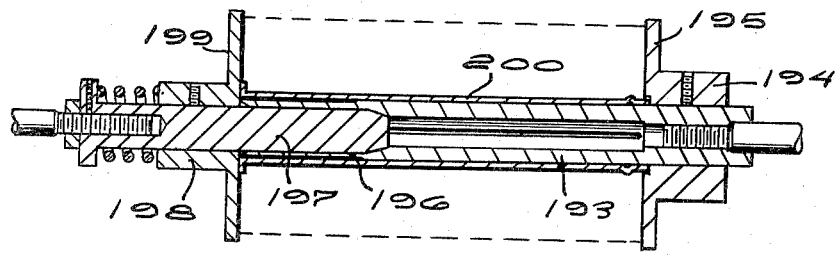
Fig. 8 is a sectional view of the winding mandrel upon which the filter webs are spirally wound.

In proceeding with this invention, the material which goes into the rolled element is supplied in strip form, the strips being simultaneously spiral rolled to form the filter element and in the apparatus which I have constructed, a mandrel is provided upon which the strips of material are rolled. As the filtering webs of material are of a longer extent than the other strips of material in the machine, it is necessary that the other strips be cut off prior to the cutting off of the web material. Accordingly, I feed the filter web material ahead of the feeding of the other strip material and provide controls for the cut-offs to automatically operate at the correct point to provide the different supply needs. Each of the webs and strips are supplied from reels which are so arranged that more than one reel from which the web or strip is drawn may be supplied so that as the web or strip which is drawn from the reel is exhausted, another supply closely adjacent may be used for piecing up and continuing the operation, while the reel which is exhausted is replenished. The supply of the strips and filter webs is drawn over a framework of substantial extent to provide a rather long passage of the strips and web material from their source of supply to the roll element and I utilize this long passage for providing a looped arrangement from which the web or strip may be quickly drawn with little friction and replenished between stoppages of the roll for withdrawing from the mandrel. Also along this length of extent of the web material, cement is applied to those portions which it is desired should be adhered securely to other parts and also a chemical treatment is provided on the web material.

The apparatus may be conveniently divided into a section A, where there is positive feeding of the material forwardly, section B, where the paper material is supplied, and a section C, where the corrugation of the spacing material is stored, corrugated and fed into the machine. Section B may have the main supplies located centrally of the apparatus whereas the spacers may be fed in at an angle from one side or another of the apparatus as is indicated more clearly in Fig. 2.

The general arrangement of the apparatus is that of providing a framework having a plurality of uprights (Fig. 1) 40, 41, 42, 43, 44, 45 and so forth which are arranged in spaced relation being secured together by suitable ties such as horizontals or diagonals to maintain them in a relationship for supporting various operating parts of the machine. The strips and the web material are supported during a majority of their travel upon an apron or track over which they are drawn, this being particularly so in connection with the corrugated metal foil as this is of a somewhat heavier nature and cannot be permitted to sag, as sagging would increase the friction and load on certain parts. The metal foil which is used as a spacer is supplied from a suitable source such as a spool 50 mounted on a support 51 (see Fig. 1) on an axis 52 and is drawn as at 53 upwardly by corrugating rolls 54 and 55 (see Figs. 17–17). The material 53 passes beneath a guide 56 and over a second flanged guide 57 in its passage to the corrugating rolls 54 and 55. It also passes beneath a feeler arm 58 which has a curled edge 59 and which is so weighted as to press against the strip of metal foil. The metal foil passes over a support 60 which is cut away as at 61 so that should the foil fail or run out, this feeler arm 58 will swing about its pivot 62 through this opening and will rock the mercury switches 63 and 63' (Fig. 15) supported on arm 64 to exercise certain controls of an electric circuit. The corrugating rolls 54 and 55 are driven by means of gears 65 from an electric motor 66 through a belt 67, and reduction gear box 68. The foil is shown as emerging from the rolls 54 and 55 in a corrugated form 69 where it drops downwardly from the rolls in a long loop as shown in Fig. 1 and when this loop approaches a point to almost touch the support for the machine, it engages a contact wire 70 closing an electric circuit of which the metal foil is a part, whereas when the foil is drawn upwardly so that the loop does not reach so low, the foil 69 will contact another wire 71 for energizing another electrical control of the feeding unit of which the metal foil is a part of the circuit. These controls are arranged to cause the motor 66 to operate or shut off as will be more fully explained in connection with the electric circuit for operating this corrugating unit.

A similar arrangement is provided for a narrow strip of foil 75 which is drawn from a suitable source of supply 76 shown in Fig. 2 which will pass through corrugating rolls similar to those shown in Figs. 15–17 but of less width to be driven by a motor designated 77 in Figs. 1 and 2 for corrugating and feeding the corrugated strip 78 of material. This strip also is provided in loop form at one side of the loop of the wider material 69 as shown in Fig. 1 but on the other side of a dividing partition 79. The corrugated foil 69 is led over a supporting apron 80 to the forward part of the machine while the narrow spacing foil 78 enters a channel 81 by which it is supported and guided and through which it leads along the side of the frame of the apparatus and then into the feeding section A as will presently appear in greater detail.

As shown in Fig. 1, there are two filter webs which comprise a filter paper. The upper web is supplied from a reel 85 and is withdrawn as at 86 to extend between feed rolls 87 and 88 (see Fig. 18) which are driven by gears 89, 90 and gear 91 from motor 92 through belt 93 and reduction gear box 94. Guard 95 shields the belt 93 from contact by a person. A feeler 96 is pivoted as at 97 and has a curved end 98 to rest upon the web 86 after it has passed about the guide roll 99 having flanges 99'. This feeler carries on the platform portion 100 mercury switches 101 and 102 for exercising control of the electric circuit for controlling the motor 92 and also for indicating the exhaustion of the web prior to its end passing through the feed rolls 87, 88. After the web has passed through the feed rolls just described in Figs. 18 and 19, the web passes over a guide roll 103 (Figs. 1 and 24) where it depends in a long loop designated 104, passing beneath a weight 105 and then passes over another guide roll 106 (see Fig. 24) and then to another operation to be later described.

The weight 105 comprises a pair of rolls 107 and 108 (Fig. 26) on a shaft 109 which is supported in bearings 110 in the side walls 111 of a casing, the whole of which is of a suitable weight to draw the loop of web material 86 downwardly between rolls 103 and 106. As this weight descends, it will engage the swingable foot 112 (Fig. 1) of a control switch 113 which is in an electric circuit for controlling the motor 92.

After the upper web passes over the roll 106, it passes about a roll 114 (Fig. 24) supported from the framework of the machine and thence over a further guide 115 in passing toward the front of the machine. As the web material 86 passes from its guide roll 106 to roll 114, it passes over a padding roll 116 which transfers liquid cement 117 from the box 117' to the surface of the web 86 which contacts this roll. In order that the web may positively contact and exert some little pressure upon this roll 116, a presser roll 118 is provided on the end of arm 119 pivoted as at 120 and drawn downwardly by a spring 121 which may be suitably anchored at its other end to a support 122. The box 117' with its roll 116 and presser 118 may be completely removed from the machine as it merely rests upon brackets 123 which are supported by hangers 124 from the upper framework of the apparatus. In order that the web may maintain the desired lateral travel, the guide 106 is in the form of a roll with flanges 125 (Fig. 25) which engage the edges of the web 86 and prevent lateral movement during its travel. Likewise, the guide roll 114 is provided with flanges 126 which perform a similar guiding function. The adhesive will be applied to the surface of the web in a width which will correspond with the width of the applicator roll 116 as may be better illustrated in Fig. 25. The box 117' may be sub-divided by a partition 127 which will maintain the adhesive 117 in a smaller area of the box so that a desired depth may be provided.

In its further travel, the web material 86 will extend over a guide 130 and thence over a further guide 131 both supported in the upright part of the frame 43 and thence will travel through a chemical treating station 132 shown generally by the arrow in Fig. 1 and specifically in Figs. 22 and 23.

This chemical treatment of the web 86 is shown on a larger scale in Figs. 22 and 23 where it is shown looking from the opposite side of the machine from the showing in Fig. 1. Triethanol amine may be applied for the reduction of acidity and other advantages, as set forth in Patent No. 2,093,430. This chemical treatment unit comprises a tray 133 which may rest upon the angle iron framework 134 of the machine forming lips for its support. This tray has supported on its side walls a compartment 135 which will contain the chemical treatment to be given the web material 86 and as it is desirable that this bath be kept heated, a liquid, such as oil, is provided beneath the compartment 135 as at 136 which is heated by an electric heater 137 located in this oil bath. A thermostat 138 is provided for controlling the heater so as to maintain the bath at a constant temperature. A padding roll 139 dips into the bath in compartment 135 and serves to pad the treatment onto the web 86 which is pressed into contact with the roll 139 by the weight of roll 140 pivoted at the end of arm 141 on pivot 142. A pipe 143 may be used to supply additional material to the bath 135 that its level may be maintained at a certain desired depth.

Should the top web 86 become exhausted from supply reel 85, there is provided a similar reel 85' supported on the standard 40 below the reel 85 and the web of material may be led from this reel or from either reel as may be desired and while the machine is running from one reel the other reel may be replenished at will.

Another web of material which is the lower web and is similar in all respects to the web 86 is designated 145 and is drawn from the reel 146 or from an auxiliary reel 146' both of which are supported on the standard 41 and from either of which the web 145 may be drawn. This web runs beneath a weight 147 (like weight 105) which will contact with the arm 148 of a switch 149 to control the motor 150 which draws the web 145 from its reel, passing it through feeding rolls similar in all respects to the feeding rolls previously described in Figs. 18 and 19 for feeding the web 86 from its reel. This web 145 also has adhesive applied to it as at 151, similar to that shown in Fig. 24, as it is drawn between guides 152 and 153 (see Fig. 1) and then passes over a guide 154 within the standard 43 and thence to the mandrel of the machine (see also Fig. 5). No chemical treatment need be applied to this web.

The spacer strips are supplied from reels at either side of the main central axis of the machine and are each fed in at an angle to the central axis. In Fig. 2, one spacer strip is supplied from unit 160 on one side of the machine whereas two spacer strips are supplied from other units 161 and 162 at the other side of the machine. These two spacer strips supplied from units 161 and 162 are superimposed one on the other and form in effect a single thicker spacer strip in cases where a double thickness space is desired. In each case of the spacer strips, there are two reels 163 and 164 in unit 160, 165 and 166 in unit 161, and 167 and 168 in unit 162, provided side by side. The spacer strip is led from one reel providing an opportunity for replacement of the other reel so that as one strip is exhausted the end of another strip from the companion reel may be attached to the exhausting trailing end and the feed continued. In each case, feed rolls are provided similar to the feed rolls shown in Figs. 18 and 19 but narrower, which feed rolls are controlled by electric motors designated 169 in unit 160, 170 in unit 161 and 171 in unit 162. As may be best seen in connection with Fig. 1 as well as Fig. 2, the strip 173 may be drawn from reel 165 and looped below a weight 174 which may drop to operate arm 175 of switch 176. Likewise, a strip 177 is drawn from reel 167 by means of its motor 171 and passes beneath weight 178 and thence over guide 180 and beneath a cement applying unit 181 and thence to the mandrel (see also Figs. 3 and 5). Also on the other side of the machine, spacer strip 182 (see Figs. 2 and 3) is drawn from reel 164 by means of motor 169 and passes beneath weight 183 and beneath glue applying mechanism 184 (see Fig. 1) and thence between the wide filter webs 86 and 145 as coiling occurs.

At the forward portion of the machine, that designated more generally A in Figs. 1 and 2, and shown in greater detail in Figs. 3–7 inclusive, an arrangement is provided for a more positive control of the strips or web materials which are being fed. In Figs. 3 and 5 which are shown on a larger scale, the views are taken from the other side of the machine from that shown in Fig. 1. As seen in Figs. 3 and 5, the upper wide web 86 extends over an apron 185 which extends to a point fairly close to the mandrel which is designated generally 186. Likewise, the lower web 145 extends over an apron 187 which terminates close to the mandrel 186. In order to feed these webs positively along these aprons, a wire brush is provided for each web designated 188 and provides a back with wire bristles which will engage the webs, the wire bristles being so inclined that movement toward the mandrel will cause the webs to be fed along the apron positively whereas movement in the opposite direction will permit the bristles to slide along the web. Each of these brushes has a bracket 189 to which a link is connected as at 190 for linking the brush to the piston of air cylinders 191 for the upper web and 192 for the lower web. The feeding relation which these cylinders bear to the other mechanism will be later more fully described. These two webs are fed forwardly together to the mandrel for reeling.

With reference to Figs. 5 and 8, the mandrel 186 comprises a power-driven spindle 193 which is provided with a hub 194 having a flange 195. The mandrel also is provided with a bore 196 into which a stud 197 may extend. The stud has mounted upon it a hub 198 and a flange 199 which hub is resiliently mounted for sliding movement along the stud 197. A core 200 is placed by hand upon the mandrel, when the stud 197 and flange 199 are retracted as shown in Fig. 4, and the core is confined between the flanges 195 and 199 during the winding operation. For the commencement of the operation, the two filter webs 86 and 145 are started about the cord 200 by hand and secured to the core by adhesive strips of material, and then are reeled one revolution with no spacing of any sort between them. After this, the spacing means are automatically advanced to the mandrel and are then drawn into the coil and the coil builds up with the spacing means to the required diameter.

Figure 9:
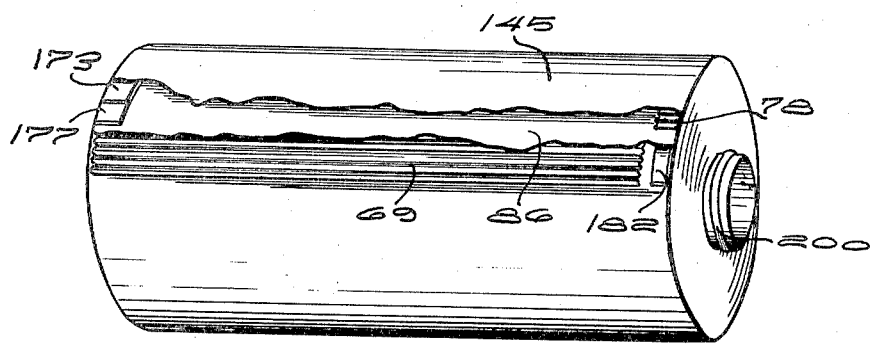
Fig. 9 is a perspective view with parts broken away of the filter element which is wound upon the mandrel of Fig. 8.

The two webs of paper 86 and 145 are seen in Fig. 9 and between these two webs there is provided at one edge the corrugated spacing strip of aluminum foil 78 while at the other edge there is provided the two narrow blocking strips 173 and 177. These two blocking strips as seen in Fig. 5 are led inside of the framework 45 and along aprons 201 and 202, one above the other where they are engaged by dogs 203 and 204 which are pivoted at 205 and 206 so that their weight will cause them to fall against the strip and a finger will engage the strip so that movement in one direction will feed the strip along the apron towards the mandrel whereas movement in the other direction will permit the dogs to drag over the strip for another grip. These dogs are mounted upon a carriage 207 which is slidable along a guide 208 (see Fig. 3) and is moved by piston in cylinder 209 having its piston rod 210 connected to this carriage for reciprocation thereof. These strips 173 and 177 become superimposed one upon the other between the webs 86 and 145 and having had adhesive applied to them are cemented together and also to the opposite webs to positively close the two edges of the webs against the leaking therefrom of any liquid to be filtered. The corrugated strip 78 (Fig. 3) to be located between the opposite edges of the webs 86 and 145 is fed in between the two webs 86 and 145 by the same cylinder 209 by advancing pawls. This feeding of the strips by the reciprocating means just described takes place only at approximately the beginning of the winding operation.

The corrugated wide aluminum foil 69 is used for spacing the two webs as coiled together about the mandrel and is advanced from its apron 80 (Fig. 5) over a feed apron 225, at approximately the beginning of the winding operation, by means of a pawl 226 pivoted at 227 on carriage 228 (see also Fig. 4) which carriage slides on bar 234 supported from frame 215 by rods 216. At the same time, the narrow blocking strip 182 is fed along apron 231 (see Figs. 3, 4, 6 and 7) by pawls 232 which are pivotally mounted on carriage 233 which slides on bar 234' supported from the frame 215' by rods 216'. These carriages 228 and 233 are connected together by rod 238 so as to be fed forward simultaneously by piston rod 229 operated by air cylinder 230 (Fig. 5). These are advanced at a predetermined time, at about the start of the winding operation of the filter paper 86 and 145 on the mandrel, so that as the mandrel turns winding occurs of all seven of the webs and strips which are coiled together about the core 200 which is mounted on the mandrel.

Figure 10:
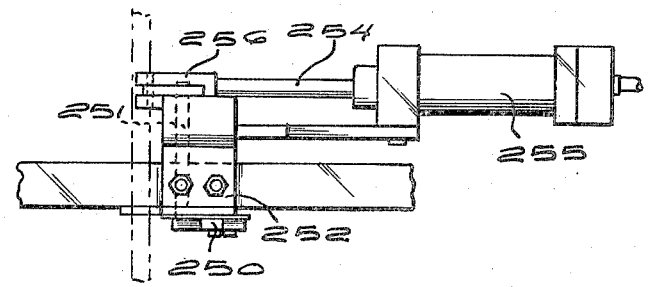
Fig. 10 is a fragmental plan view illustrating a detail of the cutter and its operating mechanism for severing one of the strips.
Figure 11:
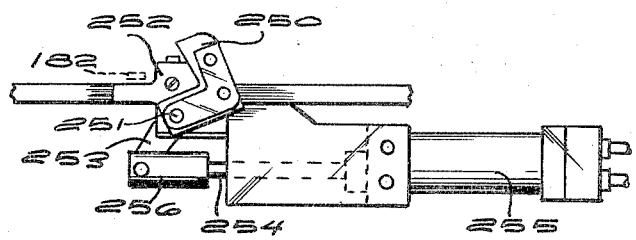
Fig. 11 is a side elevation of the structure shown in Fig. 10.

It is desirable that the spacing strips and blocking strips be omitted from the outer layers of the reel, near the end of the winding operation so that the filtering webs 86 and 145 will contact and be closed at the end of their spiral coil and accordingly, just prior to the completion of the coil, the corrugated material and the narrow strips are cut and sufficient reeling continues without these strips to provide the proper seal for the filter element being rolled. The coil is to be of a certain finished diameter which is gauged by the feeler 235 (Fig. 5) on the end of lever 236 which has weight 237 to move it in one direction. Switches are controlled by this lever and at a predetermined point in the movement of the lever, an operation occurs to cut off the metal foil material 69 and 78 and narrow strips 173, 177 and 182. The wide foil 69 is cut by knife 240 seen in Figs. 3, 4 and 5, which is pivoted to swing in a plane at right angles to the movement of the corrugated foil 69 but being pivoted in a block 241 on a pin 242 and is urged by spring 243 against the block 241. This guillotine knife cuts down along an edge of a companion jaw 244 and is swung by being connected as at 245 to a piston rod of an air cylinder 246 which is controlled by an electrically actuated valve so that at the proper time the knife 240 descends and cuts the foil. At the same time that this foil is cut, a knife such as shown in Figs. 10 and 11 designated 250 serves to cut the narrow strips of material at a point of advancement similar to the point of cutting of the foil 69. The knife 250 is mounted on a shaft 251 swingable in a block 252, the shaft being swung by the link 253 connected to the piston rod 254 of an air cylinder 255 by a bifurcated end member 256. Thus, as the cylinder draws the piston rod inwardly, the knife will swing in an arc to cut a strip of material as 182 or other strips in its path. There is one of these cutters for each of the strips and all would operate simultaneously to sever the material which is inserted between the two webs 86 and 145 or between the coils of these webs as they are reeled.

Figure 12:
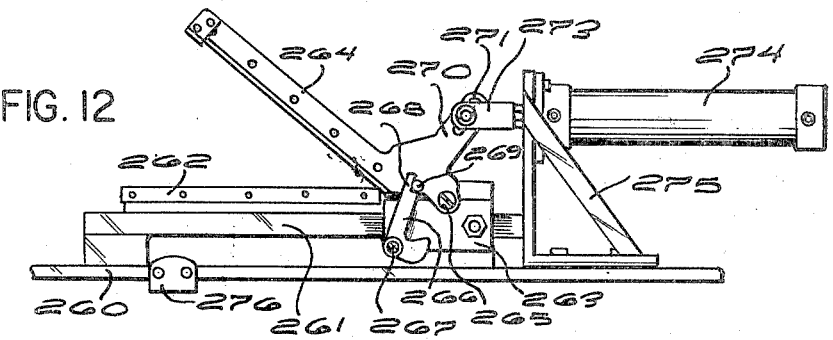
Fig. 12 is a side elevation of the cutters which are used for cutting the wide filtering web material.
Figure 13:
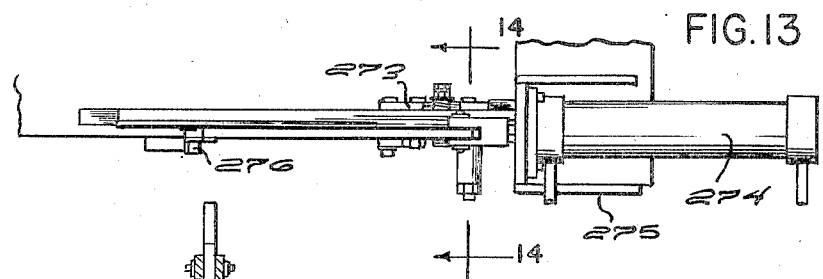
Fig. 13 is a top plan view of the structure shown in Fig. 12.
Figure 14:
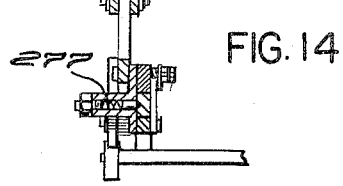
Fig. 14 is a section on line 14—14 of Fig. 13.

After the severing of the strips and foil as above referred to, the webs are advanced a further predetermined amount by reason of the continuance of the mandrel to rotate and at another predetermined point, the webs are severed by a device as shown in Figs. 12–14 inclusive, in which case the severing is by means of cutters in the general form of shears which move in across the webs and then sever. As shown in Fig. 12, the framework of the machine is designated 260 providing a slideway 261 along which the lower jaw 262 of the severing means may slide. This severing means comprises carriage 263 from which the jaw 262 extends while the upper jaw 264 is pivoted on this carriage as at 265 and is held in its upper open position by a dog 266 pivoted as at 267 on this carriage 263. This dog has a notch 268 which extends beneath a pin 269 of the cutter so as to support it in an upper position as seen in Fig. 12. An arm 270 of this blade is connected through a slot 271 to the bifurcated end 273 of the piston rod of the air motor or air cylinder 274 which is fixed on the bracket 275. Thus as the piston rod is moved to the left as shown in Fig. 12 the carriage 263 will be slid along its slideway 261 until such point as the dog 266 engages a tripping block 276, at which point the jaw 262 will have moved beneath the webs to be severed and the jaws 264 will have moved to a point above these webs. After the dog has been rocked out from beneath the pin 269, further movement of the piston will close the jaw 264 down against the jaw 262 so that the webs will be severed after which the retraction of the piston will first open the cutting jaw 264 and then will slide the carriage 263 back to its initial position and the dog 266 will be swung by its resilient torsion spring 277 (Fig. 14) back to a point beneath the pin 269 to hold it in open position.

Electrical circuit

Figure 33:
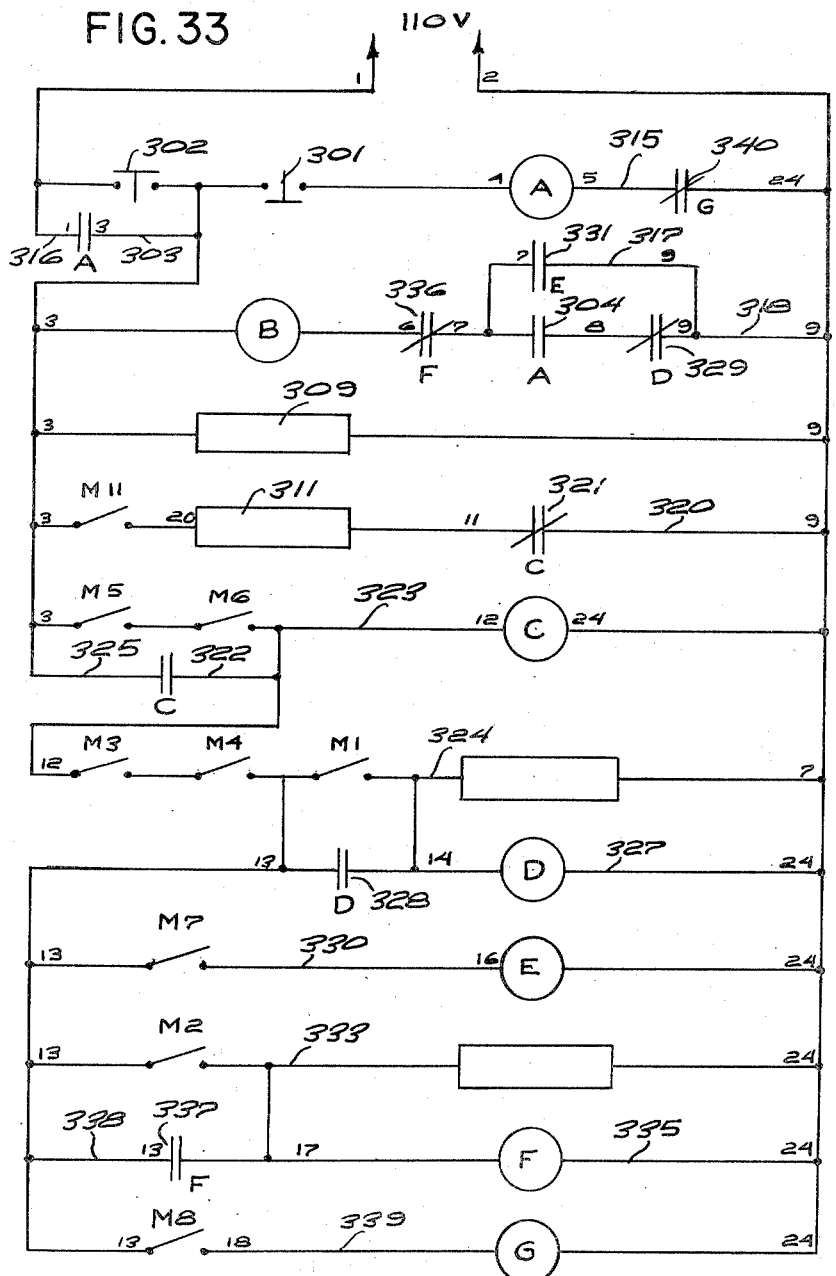

The sequence of operation and the control thereof will be explained in connection with the schematic electrical diagrams in Figs. 27–33 inclusive. The wiring layout for one electrical system is shown in connection with Figs. 27, 28 and 29 and a flow diagram which assists in the explanation of these three figures is illustrated in Fig. 33. The same terminal block, designated generally 300, is shown in Figs. 27, 28 and 29 with three diagrams of leads from this terminal block for clarity. Relays A to G (Fig. 27) are shown as consisting of four different contacts (two normally open and two normally closed), this type being used as available on the market although all of the several contacts of each one are not used in any one of the relays; however, by this arrangement the relays may be interchangeable. The leads to the microswitches controlled by the air motors are shown in Fig. 28 and the leads to the air valves for the motors shown in Fig. 29. The flow line is shown in Fig. 33 and in this figure the different relays are lettered the same as in Fig. 27. Thus the contacts in relay A shown in branch 315 of Fig. 33 are shown at 303 and 304 in branch 318 as it exists across the relay B. Two parallel lines designate a normally open contact which may be closed and two parallel lines with a diagonal line crossing designate a normally closed contact which may be opened. The microswitches are designated with a letter M plus a number for individual characterization. In order to simplify tracing of the wires leading from the terminal block 300 each of the different terminals are numbered from 1–24 and these figures are placed on different leads adjacent the switch, contact or part to which they extend so as to facilitate tracing of the lead wires. These characters are also shown correspondingly in Fig. 33.

Assuming the stop switch 301 is closed as shown in Fig. 33, the start button 302, which is held open by a spring action, may be pressed closed which energizes a circuit through the relay A in branch 315 and the circuit through this relay A also closes the normally open contact 303 of this relay A, similarly lettered in Fig. 33 in shunt 316 which is a holding contact and so closes the normally open relay 304 of relay A in branch 318 which energizes relay B in this branch which in turn energizes magnetic starter 305 (Fig. 29) to start the motor 306 connected to the line which starts the winding of the paper on the mandrel 186. At the same instant, the valve 307 for the air motor 309 of the flange plate 199 is energized so as to cause this flange plate to advance into position to guide one end of the webs of paper being wound. At the same instant also, the air valve 311 which controls the feed cylinders 209 and 230 is energized (microswitch M11 being closed) so as to cause these slides to advance and feed the spacing strips and corrugated aluminum foil between the webs. When these feeder slides are in their extreme forward position they close microswitch M5 and M6 as shown in Figs. 28 and 33 which switches are in series and thus cause the relay C in branch 323 to be energized. This relay which has normally closed contacts 321 in series with the feeding slide branch circuit 320 causes this contact 321 to open cutting off air to the cylinders 209 and 230 permitting springs to retract the feeder slides. Relay C when energized closes a contact 322 in parallel with the microswitches M5 and M6 as shown by the shunt 325 holding this circuit closed for the next step. When the feed cylinders 209, 230 are fully retracted, microswitches M3 and M4 in the branch circuit 324 are closed and these microswitches M3 and M4 are so placed that the slides 207 and 233 must be returned to their original position before the next operation can function.

When the cartridge has become wound to its primary size, microswitch M1 shown in Fig. 28 will become closed by lever 236 (see Figs. 4 and 5) which energizes valve 326 (Fig. 29) to actuate the two cylinders 255 (one only shown in Fig. 28) and the cylinder 246 to cause the narrow paper and aluminum strips and wide aluminum foil to be cut off. Also, the relay D in branch circuit 327 is energized which closes the normally open contact 328 and opens the normally closed contact 329 in branch circuit 318 which stops the motor 306. At the same time when one of the small cutters is in its forward position, microswitch M7 in branch circuit 330 is closed thus energizing relay E in this branch circuit and at the same time closes the contacts 331 of the relay E in shunt circuit 317 to start the motor 306. When the secondary or final size of the cartridge is reached as measured by roll 235' and lever 236' in Fig. 4, microswitch M2 in Fig. 28 is closed in branch circuit 333 to energize the valve 334. This actuates air motor 274 and causes the scissors to advance and cut the webs. Also at the same time, the relay F is energized in branch circuit 335 which actuates its relay 336 in branch circuit 318 to open its contacts and stop the motor at the same time actuating the relay 337 in the shunt circuit 338 to bypass the microswitch M2 when it opens. When the scissors operate, microswitch M8 in branch circuit 339 closes energizing relay G in this branch circuit which energizes its normally closed contacts 340 in the branch circuit 315 to open this branch circuit 315 thus enabling all of the cylinders to return to their original position and with the controls setting up for the next cycle of operation.

When the microswitch M5 is closed (see now Fig. 29) the coil 341 within the dotted line 340, indicating a timer unit, is energized momentarily since the microswitch M5 is not held closed. However, this energizing is sufficient for the coil 341 to operate to lift the plunger 342 and permit the normally closed microswitch 343 to open. An air valve in the head 344 controls the dropping of the plunger 342 and is so set as to delay the time that this plunger will drop back and close the microswitch 343. During the time that the switch 343 is open, an air valve 345 will be energized so as to work a cylinder which speeds up the variable speed drive which is connected to the drive motor. The amount of time that this increased speed occurs depends upon the setting of the air valve in the head 344. Thus this length of speed up may be adjusted. The webs may be fed forward by the card clothing which engage them, by pressing the button 346 which will open the air valves 347 which will operate the cylinders 191 and 192 to feed the web the desired amount. A second pressure on the button 346 will stop this forward feed by closing the valve.

The circuit for controlling the feed of the web supply is illustrated in Fig. 30. The motor 92 may be taken for illustration. When the cartridge is wound (Fig. 1), the loop 104 decreases and the weight 105 rises off of the arm 175 on the floor or supporting surface. This arm permits the mercury switch 350 (Fig. 30) to close the contacts to energize the relay coil shown within dotted line 351 and the contacts of the relay coil close the circuit to the motor thus causing the motor to operate and feed more of the web 86 into the loop until the weight again drops down onto the arm 175 and swings it to rock the mercury switch 350 to open the circuit. When the end of the paper roll is reached, the arm 96 (Fig. 19) of the microswitch 102 swings to open the microswitch which will open the circuit to stop the motor and will by reason of its same motion close a contact 352 to cause the lamp 353 in the front of the machine to be illuminated to indicate exhaustion of the paper. At this time, the operator can by the manual switch 354 jog or inch the motor forward in rethreading of the web of paper. A similar circuit is provided for each of the controls of the different component parts of the wound coil.

In Fig. 31, I have shown another system. Here there is an additional terminal strip 360 and this circuit is used for the control of the metal foil or corrugated strips which are fed into the rolled cartridge. The terminals of the strip 360 are numbered from 26 to 38. In this case, there are four relays designated H, I, J, K. The metal foil which is controlled forms parts of a control circuit. Terminals 30, 32, 33 and 34 are insulated from the machine. They are so mounted that when the corrugated aluminum touches any one of the wires to these terminals a circuit is completed to the machine as a ground through the aluminum foil. When the wide aluminum touches the wire connected to connector 30 relay H becomes energized and closes a contact in series with the magnetic starter coil which in turn starts the motor for the wide aluminum strip. Relay H also closes a contact connected across or in parallel with the initiating contact so that the motor will continue to run until stopped by other means. When a full loop of aluminum is reached, the bottom contact to terminal 32 is made. This energizes relay I which opens a contact in series with the relay H holding contact thus stopping the motor. The motor will remain stopped since the relay I closes a holding contact across a second initiating contact. When the loop of aluminum decreases due to the winding of the cartridge at the forward end of the machine, the contact is again made at terminal 30. Relay H again starts the motor and opens a normally closed contact in series with the holding contact in relay I. The relays J and K function the same on the narrow aluminum circuit.

In Fig. 32 I have illustrated a solenoid valve 380 to control the treating material in response to its level by reason of a mercury switch 381 pivoted on lever 382 and actuated by a float 383. Heaters 384 and 385 are also located in this circuit for maintaining the treating solution at the proper temperature during operation of the machine.

The sequence of operations of the above described machine in winding elements to produce a filter cartridge are as follows:

Assuming that the mandrel expanding stud 197 and flange plate 199 are retracted as shown in Fig. 4 of the drawing, the machine attendant places a metal core 200 on the spindle 193 and then operates a control lever or button to cause the air cylinder 309 to move the stud 197 into the mandrel expanding position in which it is shown in Fig. 8. Then the machine attendant places the two sheets of paper 86 and 145, which were advanced by wire brushes, under and partly around the core and adhesively secures the end of one of these sheets to the core 200. He then operates a control button to start the machine, whereupon the mandrel will rotate to wind the sheets of paper 86 and 145 thereupon. About the same time, the above described automatically operated feed means will advance the wide sheet of corrugated aluminum 69 to the mandrel to be wound thereupon with the sheets of paper just mentioned; and at the same time, the narrow aluminum strip 78 and narrow strips of paper 173, 177 and 182 will be advanced toward the mandrel to the nip of the paper webs to be wound on the mandrel and form the cartridge shown in Fig. 9. This winding operation continues until the cartridge is nearly completed, whereupon the shearing mechanism above described will be automatically operated to shear the aluminum sheet 69 and the four narrow strips 78, 173, 177 and 182. The operation of such shearing mechanism is initiated by the feeler 235 shown in Fig. 4, and which detects that the cartridge is close to the desired final size.

The mandrel continues to rotate for, say, one or two revolutions after the shearing operation just mentioned has been effected, whereupon the second feeler 235' detects that the cartridge has reached the desired final size, and immediately the shearing blade 240, see Fig. 3, will operate to shear the two sheets of paper 86 and 145, whereupon the rotation of the mandrel is automatically stopped and the mandrel expanding stud 197 is automatically retracted to the position in which it is shown in Fig. 4. The machine attendant now removes the finished cartridge and core 200 from the mandrel; and while doing so, he holds the free outer ends of the wound paper to keep the package from unwinding until he can snap a rubber band around the cartridge to keep it from expanding until the cartridge is mounted in a metal shell or otherwise held against unwinding.

In addition to the above mechanism, a signal device is provided at the winding end of the machine, and it is controlled by electric feeler means disposed near the opposite end of the machine adjacent each advancing web or strip. Such means serves to detect when a web or strip is running out and to actuate a signal device to notify the machine attendant that an advancing strip is becoming exhausted.

It will be seen from the foregoing that all winding operations involved in forming the wound filter element are automatic except that of placing the core 200 on the mandrel, attaching the leading ends of the sheets 86 and 145 thereto, and removing the cartridge from the mandrel when the winding operation is completed.

I claim:

1. In a machine for forming a wound filter cartridge, a power-rotated mandrel operable to wind a web of filtering material thereupon, power-actuated reciprocating means near said mandrel and operable in timed relation with the rotation of said mandrel to move the leading end of a spacing strip into the nip of the winding web after a turn of the web is wound on the mandrel, whereby as the mandrel continues to rotate the spacing strip is introduced between the web windings to form a wound package having the spacing strip disposed between most but not all of the spiral windings of the web.

2. A machine as in claim 1 wherein as the mandrel continues to rotate two spacing strips are introduced in contact with the opposite faces of the web.

3. A machine as in claim 1 wherein the spacing strip is wound between two webs.

4. A machine as in claim 1 wherein two webs are wound one over the other and a spacing strip is wound upon one web and a second spacing strip is wound upon the other web.

5. A machine as in claim 1 wherein a feeler engages the forming package and stops the winding operation when the package reaches a predetermined size.

6. A machine as in claim 1 wherein severing means are provided near the winding package and are power actuated when the package reaches a predetermined size.

7. In a machine for forming a wound filter cartridge, a power-rotated mandrel operable to wind a web of filtering material thereupon, power-actuated reciprocating means near said mandrel and operable in timed relation with the rotation of said mandrel to move the leading end of a spacing strip into the nip of the web being wound on the mandrel, an apron for guiding said strip towards the mandrel, whereby as the mandrel rotates the spacing strip is drawn along the apron and is introduced between the web windings to form a wound package having the spacing strip wound throughout most of the package but omitted from the outermost web winding.

8. In a machine for forming a wound filter cartridge, a power-rotated mandrel operable to wind a web of filtering material thereupon, power-operated means near said mandrel and operable in timed relation with the first rotation of the mandrel to move the leading end of a spacing strip into the nip of the web being wound on the mandrel, whereby as the mandrel rotates the spacing strip is introduced between the web windings to form a wound package having the spacing strip disposed between the web windings.

References Cited in the file of this patent

UNITED STATES PATENTS

| Number | Name | Date |
|---|---|---|
| 832,207 | Peirce | Oct. 2, 1906 |
| 1,404,284 | Fougner | Jan. 24, 1922 |
| 1,742,768 | Kamrath | Jan. 7, 1930 |
| 1,902,312 | Rous | Mar. 21, 1933 |
| 2,093,430 | Franklin et al. | Sept. 21, 1937 |
| 2,161,831 | Manning | June 13, 1939 |
| 2,202,870 | Rowe | June 4, 1940 |
| 2,281,017 | Barnhardt | Apr. 28, 1942 |
| 2,318,056 | Christman | May 4, 1943 |
| 2,369,801 | Roesen | Feb. 20, 1945 |
| 2,380,111 | Kasten | July 10, 1945 |
| 2,427,862 | Judkins | Sept. 23, 1947 |
| 2,475,789 | Kunz | July 12, 1949 |
| 2,486,669 | Nassimbene | Nov. 1, 1949 |
| 2,493,340 | Cohen et al. | Jan. 3, 1950 |
| 2,507,818 | Sager | May 16, 1950 |
| 2,522,857 | Butler | Sept. 19, 1950 |
| 2,564,637 | Chase | Aug. 14, 1951 |
| 2,568,349 | McKee | Sept. 18, 1951 |
| 2,599,604 | Bauer et al. | June 10, 1952 |
| 2,607,494 | Valente et al. | Aug. 19, 1952 |